United States Patent [19]
Lee et al.

[11] Patent Number: 5,625,807
[45] Date of Patent: Apr. 29, 1997

[54] SYSTEM AND METHOD FOR ENABLING AND DISABLING A CLOCK RUN FUNCTION TO CONTROL A PERIPHERAL BUS CLOCK SIGNAL

[75] Inventors: Sherman Lee, Rancho Palos Verdes, Calif.; Michael T. Wisor, Austin, Tex.

[73] Assignee: Advanced Micro Devices, Sunnyvale, Calif.

[21] Appl. No.: 308,596

[22] Filed: Sep. 19, 1994

[51] Int. Cl.$^6$ ........................................... G06F 1/08
[52] U.S. Cl. .................... 395/560; 395/750; 364/240; 364/270.2; 364/273.1; 364/273.2
[58] Field of Search .................... 395/550, 750, 395/575, 800, 560, 559; 364/200

[56] References Cited

U.S. PATENT DOCUMENTS

| | | | |
|---|---|---|---|
| 4,573,117 | 2/1986 | Boney | 364/200 |
| 4,586,128 | 4/1986 | DeWoskin | 364/200 |
| 4,669,059 | 5/1987 | Little et al. | 364/900 |
| 5,021,950 | 6/1991 | Nishikawa | 364/200 |
| 5,167,024 | 11/1992 | Smith et al. | 395/750 |
| 5,203,003 | 4/1993 | Donner | 395/80 |
| 5,237,692 | 8/1993 | Raasch et al. | 395/725 |
| 5,239,652 | 8/1993 | Seibert et al. | 395/750 |
| 5,263,172 | 11/1993 | Olnowich | 395/800 |
| 5,274,797 | 12/1993 | Barlow et al. | 395/575 |
| 5,388,265 | 2/1995 | Volk | 395/750 |
| 5,428,790 | 6/1995 | Harper et al. | 395/750 |
| 5,493,684 | 2/1996 | Gephardt et al. | 395/750 |

*Primary Examiner*—Kevin A. Kriess
*Assistant Examiner*—Majid A. Banankhah
*Attorney, Agent, or Firm*—Conley, Rose & Tayon, P.C.; B. Noel Kivlin

[57] ABSTRACT

A system and method for controlling a peripheral bus clock signal through a master and/or slave device is provided that accommodates a power conservation (or "clock run") scheme in which a peripheral bus clock signal may be stopped, for example, by a power management unit or other central resource. The clock run feature is enabled or disabled by the system during or immediately following system initialization, based upon the ability of the peripheral bus components to support the clock run feature. The system includes status and command registers to provide an indication of whether each of the peripheral bus devices can support the power conservation scheme. The status and command registers both include a bit dedicated to the clock run function. The status register bit is set based upon whether that particular device can support the clock run function. After each of the dedicated status register bits is checked, the dedicated command register bit is set in each of the peripheral bus devices to either enable or disable the clock run feature.

27 Claims, 3 Drawing Sheets

SYSTEM AND METHOD FOR ENABLING AND DISABLING A CLOCK RUN FUNCTION TO CONTROL A PERIPHERAL BUS CLOCK SIGNAL

BACKGROUND OF THE INVENTION

1. Field of the Invention

This invention relates generally to power management within computer systems and, more particularly, to a system and method for turning on and off a peripheral bus clock signal through a bus bridge or peripheral devices to conserve power. Still more particularly, the present invention relates to a system and method for enabling or disabling this power saving feature based upon whether the bus bridge and peripheral devices are capable of supporting this feature.

2. Description of the Relevant Art

An ongoing developmental goal of manufacturers has been to reduce the power consumption of computer systems. Reducing power consumption typically reduces heat generation of the system, thereby increasing reliability and decreasing cost. In addition, power reduction has been particularly important in maximizing the operating life of battery-powered portable computer systems.

Various techniques have been devised for reducing the power consumption of computer systems. These techniques include increasing the integration of circuitry and incorporation of improved circuitry and power management units (PMU's). One specific technique involves the capability of stopping clock signals that drive inactive or idle circuit portions. A system employing such a technique typically includes a power management unit that detects or predicts inactive circuit portions and accordingly stops the clock signals that are associated with the inactive circuit portions. By turning off "unused" clock signals, overall power consumption of the system is decreased.

Although the capability of stopping "unused" clock signals has been generally successful in reducing power consumption, the technique has generally not been applied to clock signals that drive peripheral buses having alternate bus masters connected thereto. The reason for this limitation is best understood from the following example.

FIG. 1 is a block diagram that illustrates a computer system 10 including a microprocessor (CPU) 12, a system memory 14, a bridge/memory controller 16, and a bus interface and arbiter unit 18. A CPU local bus 20 couples the microprocessor 12 to bridge/memory controller 16 and bus interface and arbiter unit 18. A system memory bus 22 couples system memory 14 to bridge/memory controller 16. An alternate bus master 26 labeled "Master1" and a second alternate bus master 28 labeled "Master2" are coupled to the bus interface and arbiter unit 18 through a peripheral bus 30. A slave device 31 is similarly coupled to bus interface and arbiter unit 18 through peripheral bus 30.

When alternate bus master 26 requires mastership of peripheral bus 30, a request signal labeled REQ1 is asserted by the alternate bus master 26 and is detected by bus interface and arbiter unit 18. If mastership of the bus is granted in accordance with the internal arbitration logic, the bus interface and arbiter unit 18 asserts a grant signal labeled GNT1 and, accordingly, alternate bus master 26 attains mastership of peripheral bus 30 and may execute the desired cycle.

In the system of FIG. 1, the request signal REQx (i.e., REQ1 or REQ2 must be asserted by the associated alternate bus master synchronous to the peripheral bus clock signal CLK. This requirement is specified by several prevalently utilized peripheral bus standards, such as the PCI bus standard. As a result of this requirement, systems employing such peripheral bus standards are designed such that the peripheral bus clock signal CLK is always turned on, thereby allowing an alternate bus master to generate a synchronous request signal. In such systems, however, power is wasted when the peripheral bus is idle.

An additional hindrance to the employment of clock-stopping power reduction techniques for peripheral buses arises since slave devices may require a clock signal beyond the end of a peripheral bus cycle. For example, additional clock cycles may be required at the completion of a peripheral bus cycle for slave device 31 to empty an internal FIFO. If the clock signal were stopped during such a situation, the performance of the system as well as the integrity of data may be adversely affected.

The assignee of the present invention recently has overcome the problems inherent in stopping a bus clock signal and has developed a system to control a peripheral bus clock signal, which is disclosed in commonly assigned U.S. application Ser. No. 08/131,092, filed Oct. 1, 1993, the teachings of which are incorporated by reference as if fully set forth herein. The system disclosed in that application makes it possible to turn on and turn off a peripheral bus clock (such as a PCI bus), based upon usage of that bus by the central processing unit or other peripheral devices located on the peripheral bus. This power saving feature is referred to herein as the "clock run" function or feature.

One potential drawback to implementing the clock run feature, however, is that some of the components on the peripheral bus may not be capable of supporting this feature. The use of the system in such an instance will result in system errors and/or will result in certain components being unable to operate when the bus clock signal is deactivated. For example, if a peripheral master is included on the peripheral bus that does not have the capability of requesting the peripheral bus clock signal to restart during periods when the clock is stopped, this peripheral master may be rendered inoperable during these periods of clock deactivation.

It would be desirable therefore to develop a system in which the system automatically determines if the power-saving clock run feature disclosed in commonly assigned U.S. application Ser. No. 08/131,092 can be implemented based upon the capabilities of the components located on the peripheral bus.

SUMMARY OF THE INVENTION

The present invention discloses a system and method for enabling or disabling the power saving clock run feature by automatically determining if components residing on a peripheral bus can support this feature of turning off the bus clock signal during periods of peripheral bus inactivity. If every peripheral bus component can support the clock run feature, then the system enables each of the devices on the peripheral bus to perform in the clock run mode. Conversely, if any peripheral bus device cannot support the clock run feature, then the system disables each of the peripheral bus devices to prevent any device from operating in the clock run mode.

The system includes a bus interface and arbiter unit which preferably forms part of an integrated processor. The bus interface unit includes a clock control circuit for turning off and on a clock generator, which generates the bus clock signal. The bus interface and arbiter unit further includes a status register and a command register, both of which include dedicated bits to provide status and command information relating to the ability of the bus interface unit, and of the system generally, to support the power saving clock run feature of shutting off the peripheral bus clock signal.

The present system preferably accommodates one or more peripheral bus master devices, and one or more peripheral slave devices, residing on the peripheral bus. Each of the master and slave devices resident on the peripheral bus preferably include a status register and a command register. The status register includes a dedicated bit to indicate whether the master or slave device supports the power saving clock run feature. The command register similarly includes a programmable bit to indicate if the clock run feature is fully supported and is being implemented by the system.

Before the peripheral bus clock signal is stopped by the bus interface and arbiter unit, an indicator signal is generated at a clock run line by the clock control circuit. If the slave device continues to require the peripheral bus clock signal, the slave device responsively generates a clock run signal. The clock control circuit receives the clock run signal and accordingly prevents the peripheral bus clock signal from stopping. The system may further allow a peripheral bus master to assert the clock run signal to re-start the peripheral bus clock signal after it has stopped. The peripheral bus master can thereby generate a synchronous bus request signal to attain mastership of the peripheral bus. The system further accommodates a power management scheme in which the peripheral bus clock signal can be stopped and that allows an alternate bus master to request the peripheral bus clock signal to be restarted by the bus interface and arbiter unit.

BRIEF DESCRIPTION OF THE DRAWINGS

Other objects and advantages of the invention will become apparent upon reading the following detailed description and upon reference to the accompanying drawings in which.

Figure 1:
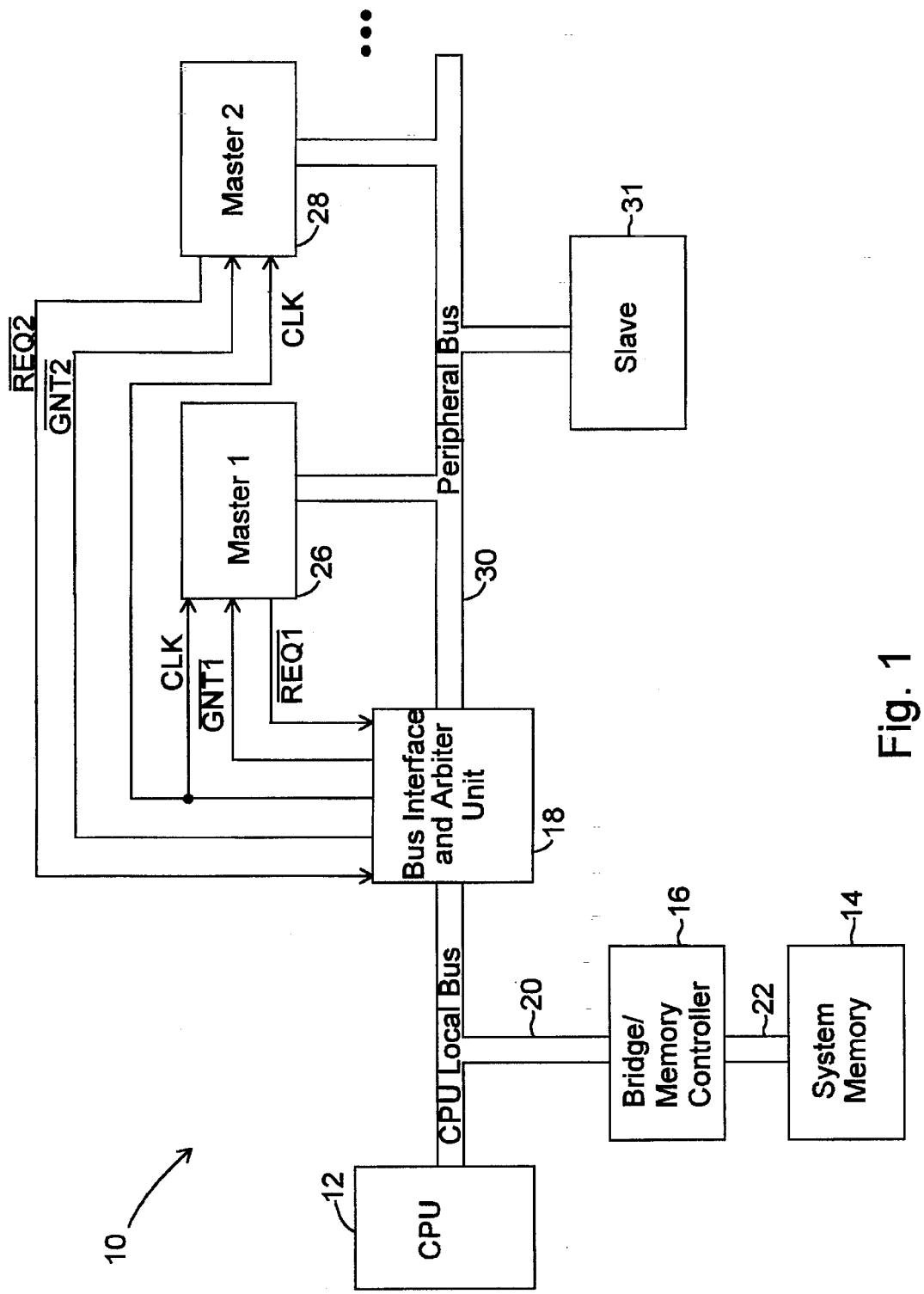
FIG. 1 is a block diagram that illustrates a prior art computer system including a peripheral bus and a plurality of alternate bus masters coupled thereto.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Figure 2:
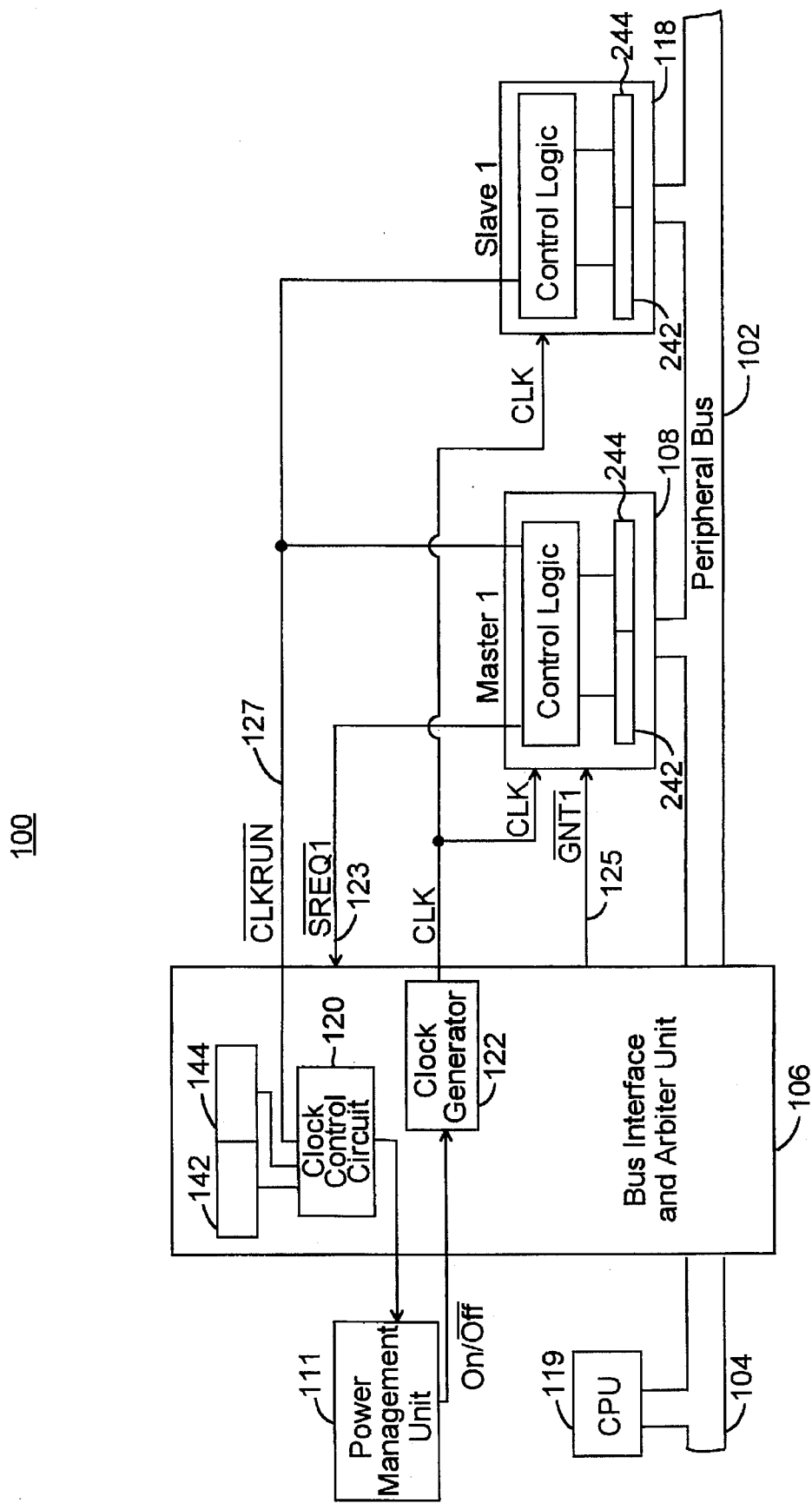
FIG. 2 is a block diagram that illustrates a portion of a computer system which implement the clock run enable feature of the preferred embodiment.

Referring now to FIG. 2, a block diagram is shown of a portion of a computer system 100 in which a peripheral bus 102 is coupled to a CPU local bus 104 through a bus interface and arbiter unit 106. An alternate peripheral bus master 108 labeled "Master1" and a slave device 118 labeled "Slave1" are coupled to peripheral bus 102, and a microprocessor (CPU) 119 is coupled to CPU local bus 104. As detailed in commonly assigned U.S. application Ser. No. 08/131,092, additional master and slave devices may reside on the peripheral bus 102, with the understanding that these additional master and slave devices operate in a manner similar to Master1 and Slave1. A power management unit 111 also is coupled to bus interface and arbiter unit 106.

The alternate peripheral bus master 108 could be embodied by a variety of specific peripheral bus devices. For example, alternate bus master 108 could be embodied by a local area network (LAN) device that connects other computer systems to peripheral bus 102, or could be embodied by an expansion bus interface that connects peripheral bus 102 to other peripheral buses.

Peripheral bus 102 has a predetermined bit width and may be connected to a variety of other peripheral devices such as, for example, CD-ROM devices. In one embodiment, peripheral bus 102 is implemented using the PCI standard bus configuration, although other peripheral bus standard configurations could be alternatively employed. The PCI standard bus configuration is described in the publication *PCI Local Bus Specification*, Revision 2.0, Apr. 30, 1993, PCI Special Interest Group. This document is incorporated herein by reference in its entirety.

Microprocessor 119 is a data processing unit that implements a predetermined instruction set. Exemplary processing units include the model 80386, the model 80486 and Pentium-compatible microprocessors. It is noted that the CPU local bus 104 may couple microprocessor 119 to a variety of other components, such as for example, a cache memory and a memory controller.

The bus interface and arbiter unit 106 includes conventional circuitry that controls well known interfacing functions such as orchestrating and transferring control, data, and address signals between microprocessor 119 and devices coupled to peripheral bus 102. The bus interface and arbiter unit 106 further arbitrates and prioritizes devices that contend for the mastership of peripheral bus 102. Similar to the example described previously in conjunction with FIG. 1, arbitration logic within the bus interface and arbiter unit 106 is configured to detect a synchronous request signal asserted by an alternate bus master and to generate an associated grant signal when mastership of the peripheral bus 102 can be attained. The bus interface and arbiter unit 106 receives a synchronous request signal SREQ1 line 123, and generates a grant signal GNT1 at line 125. It will be appreciated by those skilled in the art that these portions of the bus interface and arbiter unit 106 could be implemented using a variety of specific circuit configurations, and that exemplary circuit configurations are described in a host of publications of the known prior art. In addition, it will be understood that a plurality of request signals and grant signals may be provided by bus interface and arbiter unit 106 in instances where a plurality of master devices are included in the system.

The bus interface and arbiter unit 106 additionally includes a clock control circuit 120, a clock generator 122, a status register 142 and a command register 144. The clock generator 122 preferably generates a peripheral bus clock signal labeled "CLK" for driving peripheral devices such as peripheral bus master 108 and peripheral slave 118. As will be explained in greater detail below, the clock control circuit 120 controls the re-starting of clock generator 122 to accommodate alternate bus masters after power management unit 111 has stopped the peripheral bus clock signal CLK.

The status register 142 and command register 144 preferably comprise 16-bit registers. As one skilled in the art will understand, however, other size registers can be used without departing from the principles of the present invention. The status register preferably includes a dedicated bit at bit location 5 (or at another specified bit location), which identifies whether the bus interface and arbiter unit 106 is capable of supporting the clock run feature, as disclosed in commonly assigned U.S. application Ser. No. 08/131,092). Thus, for example, if the bus interface and arbiter unit 106 did not include a clock control circuit 120, then bit 5 of status register 142 would be set to a "0" to indicate that the bus interface and arbiter unit 106 lacked necessary circuitry to support the clock run feature. Preferably, bit 5 of the status register is set by the manufacturer, but it may also be set by the system processor during system initialization.

Similarly, the command register 144 preferably includes a dedicated bit (preferably also bit 5) which indicates whether the clock run feature is supported by all peripheral bus components. If the system determines that all peripheral components support the clock run feature, then bit 5 of the command register 144 is set (by, for example, writing a digital "1" to bit 5) to enable the clock run function in the bus interface and arbiter unit 106. During operation of the bus interface and arbiter unit 106, the clock control circuit 120 preferably checks the status of bit 5 of the command register 144 to determine if the clock run feature is enabled. If bit 5 is not enabled (i.e., bit 5 is set to a digital "0"), then the clock control circuit 120 will not transmit the IDLE signal to the power management unit 111 to shut off the peripheral bus clock. Alternatively, the power management unit 111 could check the status of bit 5 of the command register 144 before shutting off the clock generator 122.

In similar fashion, each of the master and slave devices resident on the peripheral bus preferably include both a status register 242 and a command register 244. The status registers 242 in each of the peripheral bus devices 108, 118 preferably include a dedicated bit (which in the preferred embodiment is bit 5) which indicates whether that particular device is capable of supporting the clock run feature. As with bit 5 of status register 142, bit 5 of status register 242 can be either pre-set by the manufacturer, or set during system initialization. Command registers 244 also preferably include a dedicated bit (which in the preferred embodiment is bit 5) to indicate to the peripheral device whether it should operate in the clock run mode.

The operation of computer system 100 will be described next. In this discussion, the clock run feature will be described generally, followed by a description of the enable/disable function. Initially, it is assumed that power management unit 111 has caused clock generator 122 to turn off and thus that the peripheral bus clock signal CLK is stopped. Power management unit 111 may be configured to turn off clock generator 122 following, for example, the completion of a peripheral bus cycle executed by microprocessor 119 when no bus request signals are currently pending within bus interface and arbiter unit 106.

If one of the alternate bus masters, such as peripheral device 108, requires mastership of peripheral bus 102, a corresponding bus request signal is asserted by that device. For example, if alternate bus master 108 requires mastership of peripheral bus 102, request signal SREQ1 is asserted low at line 123. As with the example of FIG. 1, however, the request signal SREQ1 received by bus interface and arbiter unit 106 at line 123 must be synchronous to the peripheral bus clock signal CLK. At this point, however, the clock generator 122 is turned off. Therefore, to provide a request signal in a synchronous fashion, the request signal SREQ1 is buffered through signal driver (which in the embodiment of FIG. 2 is internal to master device 108) that causes an asynchronous clock run signal CLKRUN at line 127 to be asserted low. When clock control circuit 120 detects the low assertion of the clock run signal CLKRUN, a signal IDLE is deasserted high by clock control circuit 120 which causes the power management unit 111 to turn on clock generator 122 and thus re-start the peripheral bus clock signal CLK (i.e., by driving signal ON/OFF high). Once the peripheral bus clock signal CLK is restarted, a synchronous request signal SREQ1 is asserted low. Additional details and alternative embodiments of the operation of the clock run feature are provided in commonly assigned U.S. application Ser. No. 08/131,092.

When the bus interface and arbiter unit 106 detects the low assertion of the synchronous request signal SREQ1, the bus interface and arbiter unit 106 generates the grant signal GNT1 according to its internal arbitration logic and consequently grants mastership of the peripheral bus 102 to the alternate bus master 108.

In the preferred embodiment, the alternate bus master 108 asserts the clock run signal CLKRUN for a total of two clock cycles when mastership of peripheral bus 102 is desired. When the clock control circuit 120 detects the resulting low signal at line 127, the clock control circuit 120 takes over the drive and maintains a logical low signal at line 127, even though the clock run signal CLKRUN has been deasserted by alternate bus master 108 following the two clock cycles. After the IDLE signal is deasserted high and clock generator 122 has been turned on by power management unit 111, the peripheral bus clock signal CLK cannot be stopped until the system microprocessor 119 regains mastership of peripheral bus 102, at which point the power management unit 111 may determine that the clock generator 122 can be stopped. For example, as stated previously, power management unit 111 may be configured to stop the peripheral bus clock signal CLK upon the completion of a peripheral bus cycle executed by microprocessor 119 if no bus request signals are currently pending within bus interface and arbiter unit 106. When the power management unit 111 determines that the peripheral bus clock signal CLK can be stopped according to such a predetermined condition, the clock control circuit 120 drives the clock run signal CLKRUN high for one clock cycle. Following this, the clock control circuit 120 releases the drive of the clock run signal CLKRUN and tri-states line 126. The power management unit 111 then turns off clock generator 122 by driving signal ON/OFF low, thereby causing the peripheral bus clock signal CLK to stop.

Referring still to FIG. 2, if request signals SREQx are asserted simultaneously or concurrently by a plurality of master devices, indicating that a plurality of peripheral bus masters desire mastership of peripheral bus 102, the clock run signal CLKRUN will again be driven low, thereby causing the peripheral bus clock signal CLK to restart. The synchronous request signals SREQx are received at businterface and arbiter unit 106. One of the grant signals for the particular master selected will thereafter be asserted in accordance with the predetermined priority established by the internal arbitration logic, and the other grant signal will be delayed until the "higher-priority" alternate bus master has completed its corresponding bus cycle. Thereafter, the bus interface and arbiter 106 unit asserts the other grant signal to allow the "lower priority" alternate bus master to execute its corresponding bus cycle.

Referring still to FIG. 2, slave device 118 is coupled to receive the peripheral clock signal CLK and is coupled to line 127. This embodiment allows slave device 118 to prevent the peripheral bus clock signal from being stopped if the peripheral bus clock signal is required by the slave following a peripheral bus cycle. For example, slave device 118 may require the peripheral bus clock signal after the completion of a peripheral bus transfer cycle to empty an internal FIFO buffer.

During operation, slave device 118 monitors the clock run signal CLKRUN at line 127. If slave device 118 detects a high assertion of the clock run signal CLKRUN and if the peripheral bus clock signal CLK is still required by the slave device, slave device 118 drives line 127 back low on the next clock cycle to prevent the peripheral bus clock signal CLK from being stopped. Thus, it is evident that if slave device 118 requires that the peripheral clock signal CLK remain on, it will detect the low assertion of the clock run signal CLKRUN (also referred to as the "indicator" signal) at line 127 by the clock control circuit 120 and will drive the clock run signal low to keep the clock running for an additional period of time to complete any pending operations. Slave device 118 could be embodied by a variety of specific peripheral devices. For example, slave device 118 could be a disk controller device or an audio controller device.

As a result of the system of FIG. 2, a peripheral bus clock signal may be stopped for power management while still accommodating alternate bus masters that must assert a synchronous bus signal to obtain mastership of the peripheral bus. Power consumption of the computer systems may thereby be reduced while maintaining broad compatibility.

The internal logic of the clock control circuit 120 and of the peripheral master and slave devices are disclosed in detail in commonly assigned U.S. application Ser. No. 08/131,092. The power management unit 111 of FIG. 2 may be configured to implement a variety of additional power management functions in addition to that described above. For example, power management unit 111 may be designed to implement functions similar to those described in U.S. Pat. No. 5,167,024 issued Nov. 24, 1992 to Smith et al. This patent is incorporated herein by reference in its entirety. In addition, although the clock generator of 122 is shown within a bus interface and arbiter unit 106 in the embodiments described above, the clock generator 122 could be incorporated within a variety of alternative circuit blocks of computer system 100.

Figure 3:
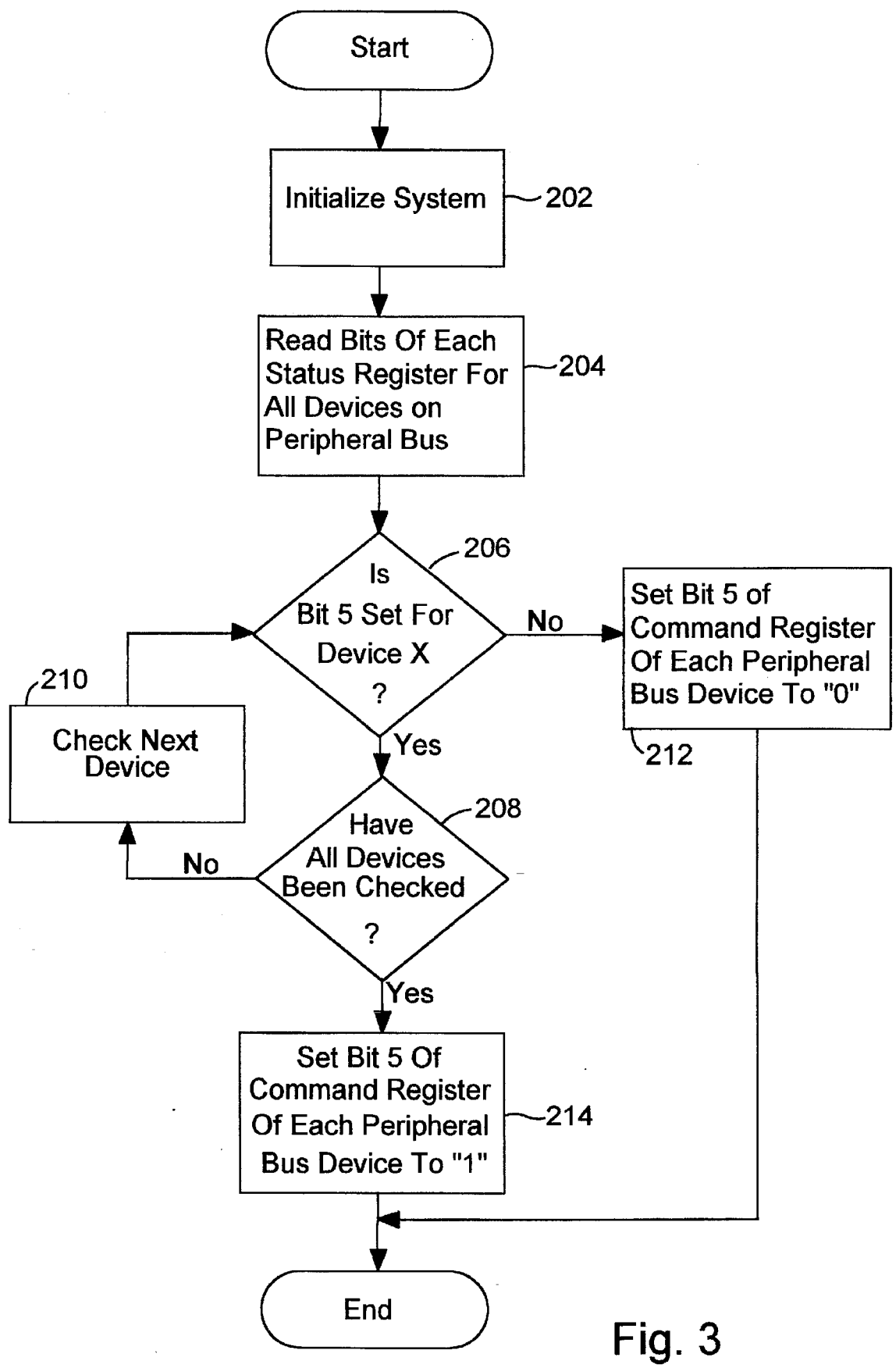
FIG. 3 is a flow chart illustrating the operation of the clock run enable feature.

The manner in which the clock run function is enabled or disabled will now be discussed with reference to FIG. 3. In the preferred embodiment, the determination of whether to enable or disable the clock run feature occurs as part of, or immediately following, system initialization, and prior to system operation. Thus, after the system is initialized or booted in step 202, the status registers of each of the peripheral bus devices are checked to determine if every device supports the clock run function. As mention, bit 5 of the status registers of each peripheral bus device is dedicated to indicate whether that particular device can support the clock run function. Bit 5 can be set by the manufacturer, or can be set by the system processor during set-up and/or initialization.

In step 204, bit 5 of the various status registers is read, and in steps 206, 208 and 210, each of the status bits are checked to determine if they support the clock run feature. Thus, in step 206, bit 5 of the status register of device x is checked to see if it is set (which in the preferred embodiment is defined as a binary "1". If bit 5 is not set (i.e. bit 5 is a binary "0", or if device x does not have a status register, then in step 212 bit 5 of the command registers of all peripheral bus devices is set to "0" to disable the clock run function in all peripheral bus devices. If bit 5 of the status register is set, then the system determines in step 208 if bit 5 of all of the status registers has been checked. If not, then in step 210 bit 5 of the status register of the next peripheral device is checked. Thus, one skilled in the art will understand that if any peripheral bus device cannot support the clock run function, then the clock run feature is disabled in every peripheral bus device.

If the system determines in step 208 that all devices have been checked, then bit 5 of the command register of all of the peripheral bus devices are set to a digital "1" to enable the clock run feature.

Numerous variations and modifications will become apparent to those skilled in the art once the above disclosure is fully appreciated. It is intended that the following claims be interpreted to embrace all such variations and modifications.

What is claimed is:

1. A computer system, comprising:
   a central processing unit connected to a local bus;
   a peripheral bus including one or more peripheral bus components resident on said peripheral bus;
   a bus interface unit coupled to said local bus and to said peripheral bus for orchestrating the transfer of data and address signals between said local bus and said peripheral bus;
   a clock generator providing a peripheral bus clock signal on said peripheral bus, wherein said peripheral bus clock signal is capable of being selectively stopped and restarted;
   a clock controller operatively coupled to said clock generator for deactivating and reactivating said clock generator to stop and restart said peripheral bus clock signal; and
   a command register associated with said lock controller, said command register including a dedicated bit to enable or disable said clock controller.

2. A system as in claim 1, wherein said clock generator, said clock controller and said command register are provided in said bus interface unit.

3. A system as in claim 2, further comprising a status register in said bus interface unit to indicate whether said bus interface unit is capable of stopping and restarting said peripheral bus clock signal.

4. A system as in claim 3, wherein said peripheral bus components resident on said peripheral bus each include a status register to indicate whether said peripheral bus components are capable of accommodating the stopping and restarting of said peripheral bus clock signal.

5. A system as in claim 4, wherein said peripheral bus components resident on said peripheral bus each include a command register with a bit dedicated to controlling the mode of operation of said peripheral bus component.

6. A system as in claim 5, wherein the mode of operation is whether to accommodate the stopping and restarting of said peripheral bus clock signal.

7. A system as in claim 5, wherein said command register of said bus interface unit and said command register of said peripheral components is programmed based upon the status of said dedicated bit of said status registers of said bus interface unit and said peripheral bus components.

8. A system as in claim 7, wherein the dedicated bit of said command register of said bus interface unit and of said peripheral bus components is set to enable accommodation of stopping and restarting said peripheral bus clock signal when all of said status registers of said peripheral bus components and of said bus interface unit indicates an ability to accommodate stopping and restarting the peripheral bus clock signal.

9. A system as in claim 7, wherein the dedicated bit of said command register of said bus interface unit and of said peripheral bus components is set to disable accommodation of stopping and restarting said peripheral bus clock signal when any of said status registers of said peripheral bus components and of said bus interface unit indicates an inability to accommodate stopping and restarting the peripheral bus clock signal.

10. A system as in claim 4, wherein the dedicated bit of said command register of said bus interface unit is set to enable said clock controller when all of said status registers of said peripheral bus components and of said bus interface unit indicates an ability to accommodate stopping and restarting the peripheral bus clock signal.

11. A system as in claim 4, wherein the dedicated bit of said command register of said bus interface unit is set to disable said clock controller when any of said status registers of said peripheral bus components and of said bus interface unit indicates an inability to accommodate stopping and restarting the peripheral bus clock signal.

12. A system as in claim 1, wherein said peripheral bus comprises a PCI bus.

13. A system as in claim 12, wherein said peripheral bus components comprise master devices and slave devices.

14. A computer system, comprising:

a central processing core;

a local bus coupled to said central processing core;

a peripheral bus;

a bus interface unit coupled to said local bus and to said peripheral bus for orchestrating the transfer of data and address signals between said local bus and said peripheral bus;

a clock generator for providing a peripheral bus clock signal on said peripheral bus;

a controller for stopping and restarting said peripheral bus clock signal;

one or more peripheral bus master devices resident on said peripheral bus, said peripheral bus master device including the capability of operating when said peripheral bus clock signal has been stopped;

wherein said controller only stops said peripheral bus clock signal if each of said peripheral bus master devices is capable of operating when said peripheral bus clock signal has been stopped.

15. A system as in claim 14, wherein said controller is provided in said bus interface unit.

16. A system as in claim 14, wherein said bus interface unit includes a command register with a dedicated bit which determines whether said controller is enabled to stop said peripheral bus clock signal.

17. A system as in claim 16, wherein each of the peripheral bus master devices includes a status register with a bit indicative of that components ability to request that said peripheral bus clock signal be restarted.

18. A system as in claim 17, wherein the dedicated bit of said command register is set based upon the status of the bit in said status registers included in said peripheral bus master devices.

19. A system as in claim 18, wherein the dedicated bit in said command register disables said controller if the bit in any of said status registers indicates that the peripheral bus master devices is unable to request that the peripheral bus clock signal be restarted.

20. A computer system comprising:

a microprocessor;

a local bus coupled to said microprocessor;

a peripheral bus;

a bus interface unit coupled to said local bus and to said peripheral bus for orchestrating the transfer of data and address signals between said local bus and said peripheral bus;

a clock generator circuit for providing a peripheral bus clock signal on said peripheral bus, wherein said peripheral bus clock signal is capable of being selectively stopped and re-started;

a clock control circuit operatively coupled to said clock generator circuit wherein said clock control circuit generates a clock-off control signal to stop said peripheral bus clock signal upon an occurrence of a predetermined condition, and wherein said clock control circuit deasserts a clock run signal at a clock run line prior to generating said clock-off control signal and stopping said peripheral bus clock signal; and a status register associated with said bus interface unit, said status register including a dedicated bit indicating whether said bus interface unit is capable of stopping and restarting said peripheral bus clock signal.

21. A system as in claim 20, further comprising:

a slave device coupled to said peripheral bus, wherein said slave device monitors said clock run line and, if said clock run line is deasserted, said slave device asserts said clock run signal if said peripheral bus clock signal is required by said slave device, and wherein said slave device includes a status register with a dedicated bit to indicate whether said slave device is capable of monitoring said clock run line and of asserting said clock run signal.

22. A system as in claim 21, wherein said bus interface unit includes a command register with a dedicated bit to indicate whether said bus interface unit and said slave device are capable of supporting stopping and restarting said peripheral bus clock signal.

23. A system as in claim 20, further comprising:

an alternate bus master coupled to said peripheral bus, wherein said alternate bus master is capable of asserting said clock run signal when said peripheral bus clock signal is stopped, and wherein said alternate bus master includes a status register indicating the ability of the alternate bus master to assert said clock run signal.

24. A method for enabling or disabling a clock run feature for a peripheral bus, to permit a peripheral bus clock signal to be selectively turned on and turned off, comprising the steps of:

(a) polling each device resident on said peripheral bus to determine if said device is capable of supporting the clock run feature;

(b) in response to the results of step (a), setting a dedicated bit in a command register in each device to either enable or disable the clock run feature in each device.

25. A method as in claim 24, wherein the step of polling each device includes the step of reading a dedicated status register included in each device.

26. A method as in claim 25, wherein said clock run feature is disabled in each device if any of the dedicated status register bits indicates that said device is incapable of supporting the clock run feature.

27. A method as in claim 25, wherein said clock run feature is enabled in each device if all of the dedicated status register bits indicate that all of said devices are capable of supporting the clock run feature.

* * * * *